United States Patent [19]

Stingelin et al.

[11] 4,380,627
[45] Apr. 19, 1983

[54] CATIONIC COMPOUNDS

[75] Inventors: Willy Stingelin, Reinach; Peter Loew, Münchenstein, both of Switzerland

[73] Assignee: Ciba-Geigy Corporation, Ardsley, N.Y.

[21] Appl. No.: 251,421

[22] Filed: Apr. 6, 1981

[30] Foreign Application Priority Data

Apr. 10, 1980 [CH] Switzerland ................. 2757/80

[51] Int. Cl.$^3$ ................. C07D 251/70; C07D 417/12; C07D 417/04; C07D 401/14
[52] U.S. Cl. ................................................. 542/423
[58] Field of Search ........................................ 542/423

[56] References Cited

U.S. PATENT DOCUMENTS 3,679,674  7/1972  Friedrich et al. ................. 542/423
4,176,229  11/1979  Kast ................................. 542/423

Primary Examiner—John M. Ford
Attorney, Agent, or Firm—Wenderoth, Lind & Ponack

[57] ABSTRACT

There are described novel cationic compounds of the formula

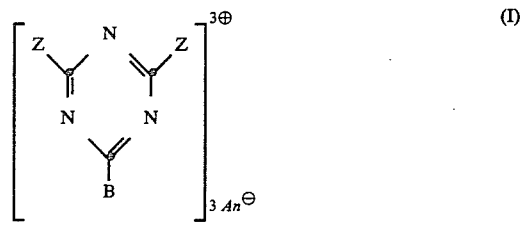

(I)

wherein

Z's independently of one another are each a radical of the formula

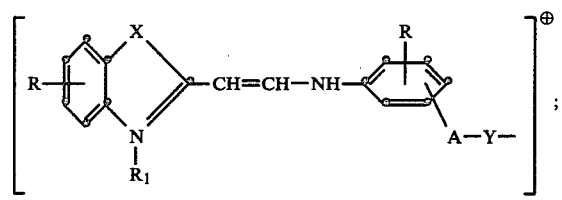

B is identical to Z or is a cationic radical different from Z;

R's independently of one another are each hydrogen, unsubstituted or substituted $C_1$–$C_4$-alkyl, unsubstituted or substituted $C_1$–$C_4$-alkoxy, the $NO_2$ group, unsubstituted or substituted acylamino, halogen or the CN group;

$R_1$'s independently of one another are each unsubstituted or substituted $C_1$–$C_4$-alkyl or $C_3$–$C_4$-alkenyl;

X is a sulfur atom or the group

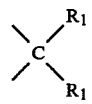

in which both $R_1$ radicals can be linked with each other to form a carbocyclic 5- or 6-membered ring;

A is the direct bond, —NH-alkylene ($C_1$–$C_4$), —O-alkylene ($C_1$–$C_4$), alkylene ($C_1$–$C_4$), phenylene, —O-phenylene or —NH-phenylene;

Y is —NH—, —$NR_1$—, —O— or —S—; and

An is an anion, and also processes for producing them and their use as dyes for dyeing and printing textile materials, such as polyacrylonitrile materials, leather and in particular paper, with greenish- to reddish-yellow shades being obtained which are distinguished by good general fastness properties.

14 Claims, No Drawings

CATIONIC COMPOUNDS

The invention relates to novel cationic compounds, to processes for producing them, and to their use as dyes for dyeing and printing textile materials, leather and paper.

The novel cationic compounds correspond to the formula I

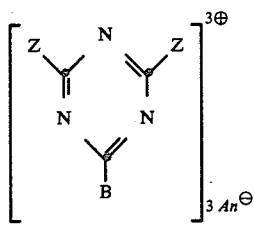  (I)

wherein

Z's independently of one another are each a radical of the formula

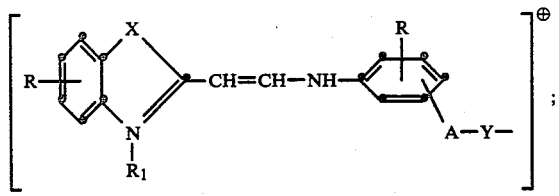

B is identical to Z or is a cationic radical different from Z;

R's independently of one another are each hydrogen, unsubstituted or substituted $C_1$–$C_4$-alkyl, unsubstituted or substituted $C_1$–$C_4$-alkoxy, the $NO_2$ group, unsubstituted or substituted acylamino, or halogen or the CN group;

$R_1$'s independently of one another are each unsubstituted or substituted $C_1$–$C_4$-alkyl or $C_3$–$C_4$-alkenyl;

X is a sulfur atom or the group

in which both $R_1$ radicals can be linked with each other to form a carbocyclic 5- or 6-membered ring;

A is the direct bond, —NH-alkylene ($C_1$–$C_4$), —O-alkylene ($C_1$–$C_4$), alkylene ($C_1$–$C_4$), phenylene, —O-phenylene or —NH-phenylene;

Y is —NH—, —$NR_1$—, —O— or —S—; and

An is an anion.

When B is a cationic radical different from Z, suitable radicals are for example those of the following structures:

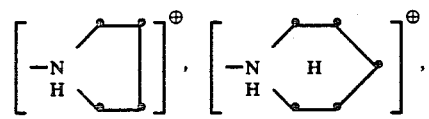

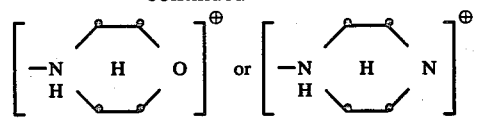

and particularly radicals of the formulae:

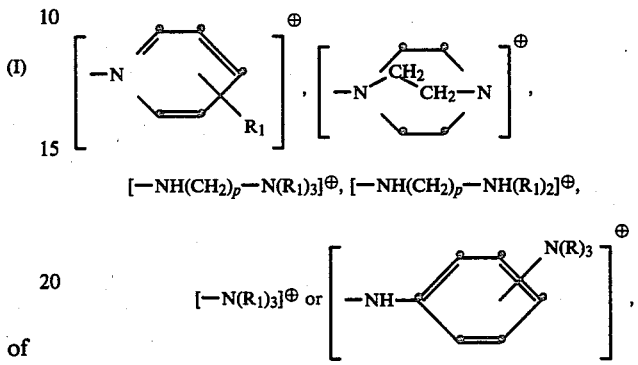

$[-NH(CH_2)_p-N(R_1)_3]^\oplus$, $[-NH(CH_2)_p-NH(R_1)_2]^\oplus$, $[-N(R_1)_3]^\oplus$ or wherein the substituents R and $R_1$ have the meanings already defined, and p is the number 2 or 3.

As an unsubstituted or substituted $C_1$–$C_4$-alkyl group, R is a straight-chain or branched-chain alkyl group, for example a methyl, ethyl, n- or iso-propyl or n-, sec-, or tert-butyl group; these groups can be substituted for example by a $C_1$–$C_4$-alkoxy group, such as the methoxy, ethoxy, n- and iso-propoxy group or n- and iso-butoxy group; by CN, by halogen such as fluorine, chlorine or bromine, by phenyl (for its part optionally further substituted by for example halogen, alkyl and/or alkoxy), by $CONH_2$, or by a carboxylic acid amide group mono- or disubstituted on the N atom (for example by $C_1$–$C_4$-alkyl).

When R is an unsubstituted or substituted $C_1$–$C_4$-alkoxy group, this is a straight-chain or branched-chain alkoxy group, such as the methoxy, ethoxy, n- and iso-propoxy group, or the n- and iso-butoxy group, which groups can be further substituted, for example by phenyl.

In the case where R is an acylamino group, it can be for example the benzoylamino or acetylamino group. The acylamino group can be substituted for example by halogen, such as fluorine, chlorine or bromine, or by an $NH_2$ group, or by an amino group mono- or disubstituted on the N atom for example by $C_1$–$C_4$-alkyl.

Where R is a halogen atom, it is in particular the fluorine, chlorine or bromine atom.

It is however also possible that the substituent R can occur more than once in one and the same benzene ring.

In the preferred cationic compounds of the formula I, R is hydrogen, or an unsubstituted, straight-chain $C_1$–$C_4$-alkyl group, especially the methyl group, or an unsubstituted, straight-chain alkoxy group, particularly the methoxy group, or halogen, in particular chlorine.

If $R_1$ is an unsubstituted or substituted $C_1$–$C_4$-alkyl group, it is a straight-chain or branched chain alkyl group, such as the methyl, ethyl, n- and iso-propyl group, or the n- and iso-butyl group; these groups can be substituted for example by $C_1$–$C_4$-alkoxy (straight-chain and branched-chain, such as methoxy, ethoxy or n- and iso-propoxy), by CN or halogen (fluorine, chlorine or bromine), by phenyl unsubstituted or substituted by $C_1$–$C_4$-alkyl or halogen, or by the $CONH_2$ group.

Where $R_1$ is an alkenyl group, it is for example the allyl group.

In the preferred cationic compounds of the formula I, $R_1$ is an unsubstituted, straight-chain $C_1$–$C_4$-alkyl group, particularly the $CH_3$ group.

When X is the

grouping, where both radicals $R_1$ can be linked with each other to form a carbocyclic 5- or 6-membered ring, it is in particular the unsubstituted cyclopentane or cyclohexane ring.

In the preferred cationic compounds of the formula I, X is the

grouping, wherein each $R_1$ is a straight-chain unsubstituted $C_1$–$C_4$-alkyl group; X is especially the

grouping.

In the case where A is an -alkylene ($C_1$–$C_4$), —NH-alkylene ($C_1$–$C_4$) or —O-alkylene ($C_1$–$C_4$) bridge, suitable "alkylene" bridges are for example the methylene, ethylene, n- and iso-propylene bridge or n- and iso-butylene bridge.

In the preferred cationic compounds of the formula I, A is bound in the m- or p-position with respect to the —CH=CH—NH bridge, and is either the direct bond, or —O-phenylene or —NH-phenylene.

As an —$NR_1$ group, Y is an —N-alkyl ($C_1$–$C_4$) group, such as the —$N.CH_3$—, —$N.C_2H_5$— or —$N.C_3H_7$ group, where the alkyl group can be additionally substituted as defined, especially by CN or halogen.

In the preferred cationic compounds of the formula I, Y is the —NH— or —$NR_1$— group, particularly the —$N.CH_3$— group.

As a $[—NH(CH_2)_p—N(R_1)_3]^\oplus$ or $[—NH(CH_2)_p—NH(R_1)_2]^\oplus$ group, B is for example any one of the following groups:

—NH—$CH_2$—$CH_2$—$N^\oplus(CH_3)_3$,
—NH—$CH_2$—$CH_2$—$N^\oplus(C_2H_5)_3$,
—NH—$CH_2$—$CH_2$—$N^\oplus$(iso-$C_3H_7$)$_3$,
—NH—$CH_2$—$CH_2$—$N^\oplus$(n-$C_3H_7$)$_3$, —NH—$CH_2$—$CH_2$—$\overset{\oplus}{N}H(CH_3)_2$, —NH—$CH_2$—$CH_2$—$\overset{\oplus}{N}H(C_2H_5)_2$, —NH—$CH_2$—$CH_2$—$\overset{\oplus}{N}H$(n-$C_3H_7$)$_2$, —NH—$CH_2$—$CH_2$—$\overset{\oplus}{N}H$(iso-$C_3H_7$)$_2$, —NH—$CH_2$—$CH_2$—$\overset{\oplus}{N}H$(n-$C_4H_9$)$_2$, —NH—$CH_2$—$CH_2$—$\overset{\oplus}{N}H$(tert.-$C_4H_9$)$_2$,

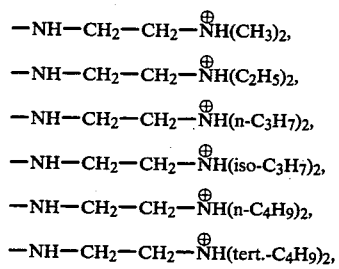

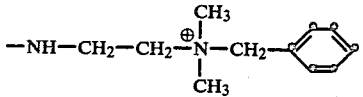

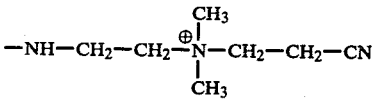

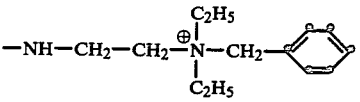

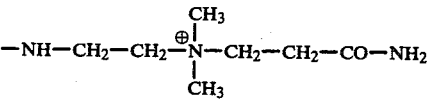

—NH—$CH_2$—$CH_2$—$CH_2$—$N^\oplus(CH_3)_3$,
—NH—$CH_2$—$CH_2$—$CH_2$—$N^\oplus(C_2H_5)_3$,
—NH—$CH_2$—$CH_2$—$CH_2$—$N^\oplus$(iso-$C_3H_7$)$_3$,
—NH—$CH_2$—$CH_2$—$CH_2$—$N^\oplus$(n-$C_3H_7$)$_3$, —NH—$CH_2$—$CH_2$—$CH_2$—$\overset{\oplus}{N}H(CH_3)_2$, —NH—$CH_2$—$CH_2$—$CH_2$—$\overset{\oplus}{N}H(C_2H_5)_2$, —NH—$CH_2$—$CH_2$—$CH_2$—$\overset{\oplus}{N}H$(n-$C_3H_7$)$_2$, —NH—$CH_2$—$CH_2$—$CH_2$—$\overset{\oplus}{N}H$(iso-$C_3H_7$)$_2$, —NH—$CH_2$—$CH_2$—$CH_2$—$\overset{\oplus}{N}H$(n-$C_4H_9$)$_2$, —NH—$CH_2$—$CH_2$—$CH_2$—$\overset{\oplus}{N}H$(tert.$C_4H_9$)$_2$, —NH—$CH_2$—$CH_2$—$CH_2$—$N^\oplus(CH_2CN)_3$,

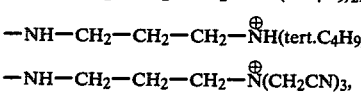

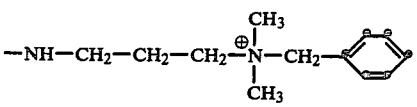

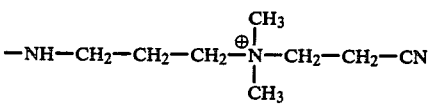

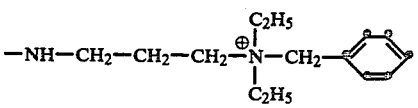

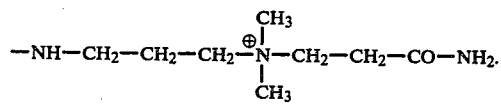

As an [—N(R₁)₃]⊕ group, B is for example any one of the following groups:

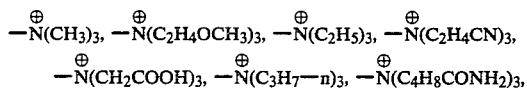

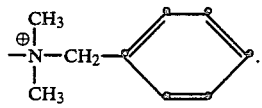

In preferred cationic compounds of the formula I, B has the same meaning as Z has, or is one of the groups

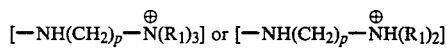

wherein p and R₁ have the given meanings.

Anions denoted by An can be both inorganic and organic anions, for example: halogen, such as the chloride, bromide or iodide ion, also the sulfate, methyl sulfate, aminosulfonate, perchlorate, carbonate, bicarbonate, phosphate, phosphomolybdic, phosphotungstic, phosphotungstomolybdic, benzenesulfonate, naphthalenesulfonate, 4-chlorobenzenesulfonate, oxalate, maleinate, formiate, acetate, propionate, lactate, succinate, chloroacetate, tartrate, methanesulfonate and benzoate ions, or complex anions, such as that of the chlorine-zinc double salts.

Preferred anions An are the formiate, acetate, lactate, chloride, sulfate and phosphate ions.

The novel cationic compounds of the formula I are triply charged, greenish- to reddish-yellow compounds, which can be produced in a known manner.

For example, the compounds of the formula I wherein B is not identical to Z are obtained by condensing 1 mol of a diamine of the formula II

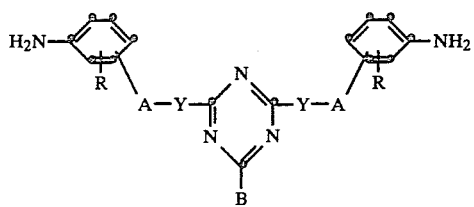

with 2 mols of an aldehyde compound of the formula III

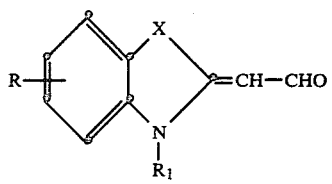

in the presence of an acid HAn.

The diamines of the formula II and the aldehyde compounds of the formula III are known and can be produced by known methods. The diamines of the formula II are obtained for example by reacting in sym. trichlorotriazine the chlorine atoms stepwise with a compound of the formula

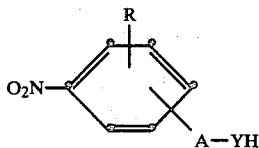

and with B-H (or a pyridine derivative), and subsequently reducing in the condensation product the NO₂ group to the NH₂ group.

Compounds of the formula I wherein B is identical to Z are obtained for example by condensing 1 mol of a triamine of the formula IV

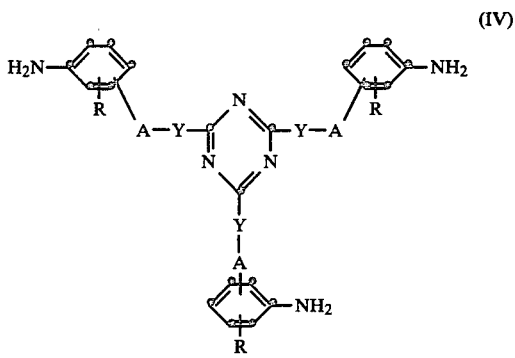

with 3 mols of an aldehyde compound of the formula III in the presence of an acid HAn.

Suitable aldehyde compounds of the formula III are for example:
1,3,3-trimethyl-2-methylene-indoline-ω-aldehyde,
1,3,3-trimethyl-5-chloro-2-methylene-indoline-ω-aldehyde,
1,3,3-trimethyl-5-phenyl-2-methylene-indoline-ω-aldehyde, and
1,3,3-trimethyl-5-cyano-2-methylene-indoline-ω-aldehyde.

The condensation reaction of the diamine of the formula II or of the triamine of the formula IV with the aldehyde compound of the formula III is performed in a known manner, for example in an aqueous medium at a temperature of about 0° to 100° C. in the presence of an acid HAn. This acid HAn is an organic acid, such as acetic acid or arylsulfonic acid, particularly benzenesulfonic acid, or it is an inorganic acid, such as hydrochloric acid, sulfuric acid or phosphoric acid.

After the condensation reaction, the novel cationic compounds are optionally separated from the reaction medium and dried. If desired or if necessary, the anion An in the cationic compounds of the formula I can be exchanged in a known manner for another anion.

The novel dyes can however also be converted, after concentration of the reaction medium by evaporation, directly into a liquid commercial form.

The novel cationic compounds of the formula I are used as dyes for dyeing and, with the addition of binding agents and optionally solvents, for printing materials which can be dyed with cationic dyes, especially textile materials consisting for example advantageously of homo- and copolymers of acrylonitrile; or synthetic polyamides or polyesters which are modified by acid groups. Dyeing is preferably performed in an aqueous, neutral or acid medium by the exhaust process, optionally under pressure, or by the continuous process. The textile material can be in the widest variety of forms, for example in the form of fibres, filaments, fabrics, knitwear, piece goods, and finished articles such as shirts and pullovers.

It is possible to produce, by application of the dyes, level greenish- to reddish-yellow dyeing and printings which are distinguished by very good general fastness properties.

Furthermore, the novel cationic dyes can be used also for dyeing and printing natural and regenerated cellulose materials, in particular cotton and viscose, with likewise greenish- to reddish-yellow, deeply coloured dyeings being obtained. The novel dyes have on these materials good substantivity and a high degree of exhaustion, and the dyeings obtained have very good fastness properties, especially very good fastness to wet processing.

A further use for the novel cationic dyes of the formula I is their application for dyeing paper of all types, especially bleached, unsized and sized, lignin-free paper. These compounds are suitable in particular for dyeing unsized paper (tissues) by virtue of the very high affinity of the compounds for this substrate.

The novel compounds are absorbed very well onto these substrates, the waste liquor finishing up colourless, a factor which is of great ecological advantage, especially in view of the present-day effluent laws.

The resulting dyeings are fast to wet processing, that is to say, they show no tendency to bleed when dyed paper in the wet state is brought into contact with moist white paper. This property is particularly desirable in the case of so-called "tissues", where it is foreseeable that the dyed paper will come into contact in the wet state (for example impregnated with water, alcohol, surfactant-solution, and so forth) with other surfaces, such as of textiles, paper, and the like, which have to be protected against discoloration.

The high affinity for paper and the high rate of exhaustion of the novel dyes is of great advantage in the continuous dyeing of paper, and render possible a much broader application of this known economical process.

The novel dyes can be applied to the paper material by the most varied processes, for example in pulp dyeing, in the sizing press and from aqueous inks by the INK-JET method.

Finally, the novel dyes can be used also for dyeing leather (for example by spraying, brushing and immersion), and for the preparation of inks.

The following Examples illustrate the invention without limiting its scope. The temperature values are in degrees Centigrade, 'parts' denote parts by weight, and %-values are percent by weight.

EXAMPLE 1

8.6 parts of 2,4,6-s-tri-(4'-aminophenylamino)-triazine and 12.7 parts of 1,3,3-trimethyl-2-methyleneindoline-ω-aldehyde are stirred up in 50 parts of water and 41 parts of methanol. The mixture is heated in about 20 to 30 minutes to 60° to 65°, and simultaneously is commenced the dropwise addition of 32.8 parts of 8% aqueous hydrochloric acid. The dropwise addition of the hydrochloric acid is complete after 2½ hours. Stirring is maintained for a further hour at the same temperature, and subsequently the methanol is removed from the reaction solution by distillation in vacuo. The dye which has precipitated is stirred up with 200 parts of cold water; it is then filtered off, washed with a small amount of water and dried at 70°. The yield is 20.5 parts of orange dye powder of the following structure:

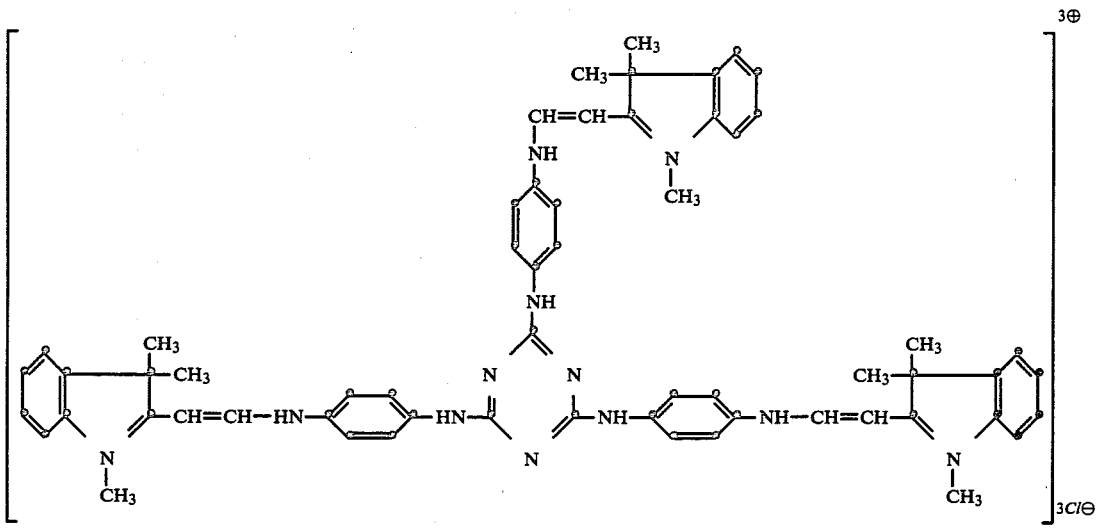

By using instead of hydrochloric acid corresponding amounts of phosphoric acid and sulfuric acid, there is obtained the same dye as phosphate and sulfate, respectively. When formic acid, acetic acid and lactic acid are employed in place of the inorganic acids mentioned, the same dye is obtained as formiate, acetate and lactate, respectively. Dyes having the stated organic counterions are distinguished by excellent solubility in water, a property which is particularly advantageous in the production of a liquid commercial preparation.

Where hydrochloric acid is replaced by formic acid in the process according to Example 1, it is possible to convert the dye, after removal of the methanol by distillation, with diluted acetic acid directly into a liquid commercial preparation.

EXAMPLE 2

6.2 parts of 2-amino-4,6-di-(4'-aminophenylamino)-s-triazine, produced by reduction of the corresponding dinitro compound, are condensed, in a manner analogous to that described in Example 1, with 8.4 parts of 1,3,3-trimethyl-2-methyleneindoline-ω-aldehyde, 35 parts of water, 27.5 parts of methanol and 21.8 parts of 8% aqueous hydrochloric acid, and subsequently isolated. The yield is 14.5 parts of a yellow dye of the following structure:

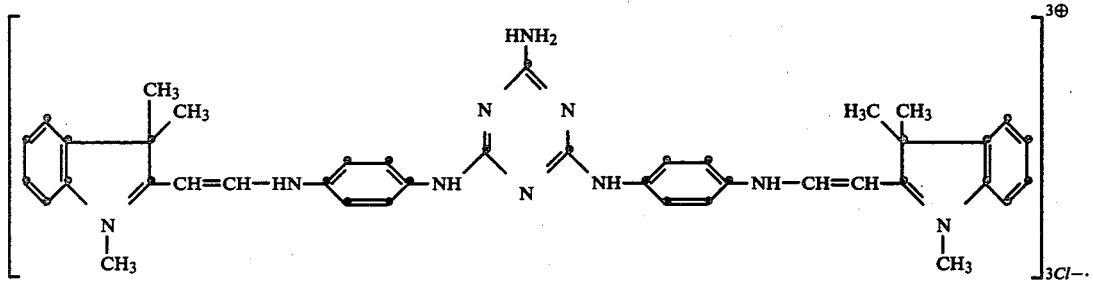

There are obtained in an analogous manner, account being taken of the stoichiometry according to Example 1 and with use of the components listed in the following Tables, triply charged dyes, which are precipitated as chloride, phosphate, sulfate, formiate, acetate or lactate.

The dyes produce on paper the shades shown in the last column of the Tables.

TABLE I

| Example | X | M | Shade |
|---|---|---|---|
| 3 | Cl | —NH—⟨C₆H₄⟩—NH₂ | yellow |
| 4 | H | —NH—⟨C₆H₄⟩—NH₂ (meta) | greenish-yellow |
| 5 | Cl | —NH—⟨C₆H₄⟩—NH₂ (meta) | greenish-yellow |
| 6 | H | —NH—⟨C₆H₃(OCH₃)⟩—NH₂ | golden-yellow |
| 7 | H | H₃CO—⟨C₆H₃⟩, —NH, NH₂ | yellow |
| 8 | H | CH₃—⟨C₆H₃⟩, —NH, NH₂ | greenish-yellow |
| 9 | H | H₃C—⟨C₆H₃⟩, —NH, NH₂ | greenish-yellow |

TABLE I-continued

| Example | X | M | Shade |
|---|---|---|---|
| 10 | H | 2-Cl, 5-NH₂ (−NH− aminoaniline) | greenish-yellow |
| 11 | H | 3-Cl, 5-NH₂ (−NH− aminoaniline) | greenish-yellow |
| 12 | H | 4-OCH₃, 5-NH₂ (−NH− aminoaniline) | yellow |
| 13 | H | −O−C₆H₄−NH₂ | greenish-yellow |

TABLE II

| Example | X | M | Q | Shade |
|---|---|---|---|---|
| 14 | H | −NH−C₆H₄−NH₂ (para) | 3,5-NH,NH₂-phenyl | yellow |
| 15 | H | 3,5-NH,NH₂-phenyl | −NH−C₆H₄−NH₂ (para) | yellow |
| 16 | H | −NH−C₆H₄−NH₂, OCH₃ | 3,5-NH,NH₂-phenyl | golden-yellow |
| 17 | H | 2-Cl, 3-NH₂ (−NH− aminoaniline) | 3,5-NH,NH₂-phenyl | greenish yellow |

TABLE II-continued

[Structure: X-substituted phenyl with CH₃, CH₃, N-CH₃, CH=CH-CHO group; and Q-substituted dicarbonyl with M-N...N-M linked by CH=CH]

| Example | X | M | Q | Shade |
|---|---|---|---|---|
| 18 | H | —NH—C₆H₃(NH₂)— | —NH—C₆H₃(Cl)(NH₂)— | greenish-yellow |
| 19 | H | —NH—C₆H₂(OCH₃)(NH₂)— (H₃CO) | —NH—C₆H₂(OCH₃)(NH₂)— | yellow |
| 20 | H | —O—C₆H₄—NH₂ | —NH—C₆H₃(NH₂)— | greenish-yellow |
| 21 | H | —NH—C₆H₄—NH₂ | —NH(CH₂)₃—N⁺H(CH₃)₂ | yellow |
| 22 | H | —NH—C₆H₄—NH₂ | —NH(CH₂)₃—N⁺(CH₃)₃ | yellow |
| 23 | H | —NH—C₆H₃(NH₂)— | —NH(CH₂)₃—N⁺H(CH₃)₂ | greenish-yellow |
| 24 | H | —NH—C₆H₃(NH₂)— | —NH(CH₂)₃—N⁺(CH₃)₃ | greenish-yellow |
| 25 | H | —NH—C₆H₄—NH₂ | —N⁺(pyridinium) | golden-yellow |
| 26 | H | —NH—C₆H₄—NH₂ | —N⁺(DABCO-like bicyclic)N | golden-yellow |

TABLE III

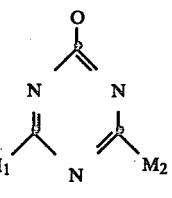

| Example | X | M₁ | M₂ | Q | Shade |
|---|---|---|---|---|---|
| 27 | H | —NH—⟨⟩—NH₂ | —NH—⟨⟩—NH₂ (with CH₃) | —NH—⟨⟩—NH₂ (with CH₃) | greenish-yellow |
| 28 | H | —NH—⟨⟩—NH₂ (with OCH₃) | H₃CO—⟨⟩ —NH—⟨⟩—NH₂ | —NH—⟨⟩—NH₂ (with OCH₃) | golden-yellow |

EXAMPLE 29

50 parts of chemically bleached beechwood sulfite pulp are mixed together with 50 parts of RKN 15 (freeness value 22° SR) and 2 parts of the dye according to Example 1 in water (pH 6, water hardness 10° dH, temperature 20°, ratio of goods to liquor 1:40). After a stirring time of 15 minutes, paper sheets are produced on a Frank sheetformer. The paper is dyed in a very intense golden yellow shade. The waste liquor is completely colourless; the degree of exhaustion attained is practically 100%; and fastness to light and to wet processing is excellent.

EXAMPLE 30

A paper web is produced from bleached beechwood sulfite pulp (22° SR) on a continuously operating laboratory paper machine. Ten seconds before the breastbox, an aqueous solution of the dye according to Example 1 is added continuously in measured amounts, with vigorous turbulence, to the thin substance (0.5% dyeing, ratio of goods to liquor 1:400, water hardness 10° dH, pH 6, temperature 20°). There is produced on the paper web a deeply coloured orange shade of medium intensity, and the waste liquor is completely colourless.

EXAMPLE 31

10 parts of a cotton fabric (bleached mercerised cotton) are dyed on a laboratory beam dyeing machine in 200 parts of liquor (water hardness 10° dH, pH 4, dye liquor circulates 3 times per minute) containing 0.05 part of the dye according to Example 1. The temperature is raised in 60 minutes from 20° to 100°, and is then held constant for 15 minutes. The dye liquor is fully exhausted, and there is obtained on the cotton fabric a deeply coloured orange dyeing which is distinguished by good fastness to light and very good fastness to wet processing.

When a textile fabric made from regenerated cellulose (viscose) is dyed by the same procedure, there is obtained on this material using the dye of Example 1 a deeply-coloured orange dyeing which has good fastness to light and very good fastness to wet processing.

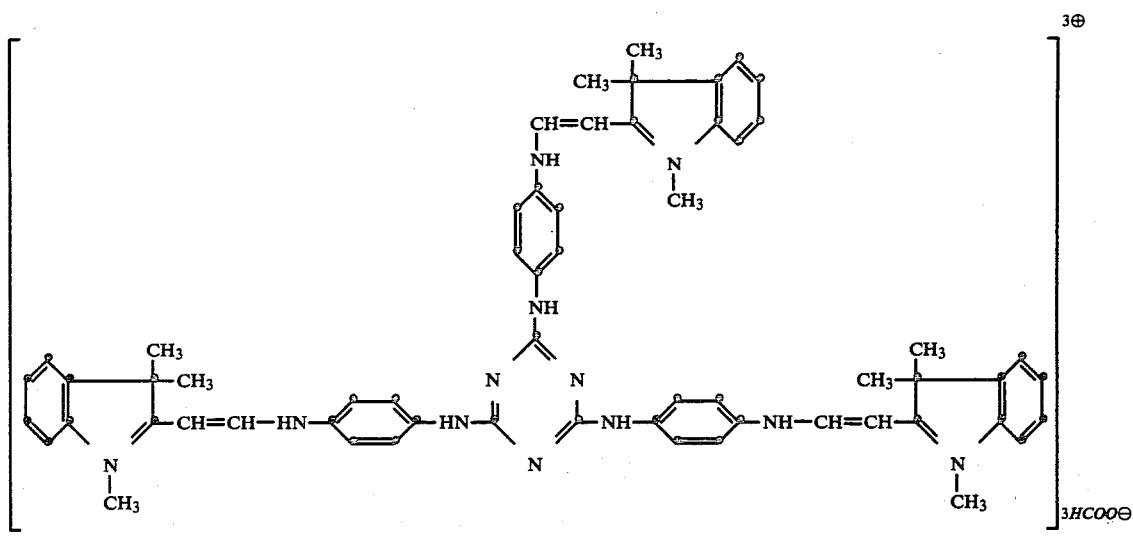

What is claimed is:

1. A cationic compound of the formula

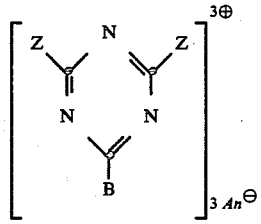

wherein
Z groups independently of one another are each a radical of the formula

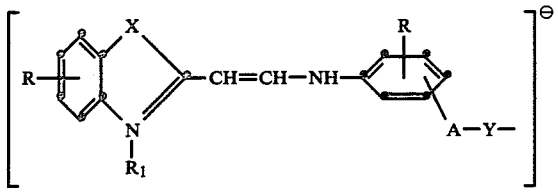

B is identical to Z or is a cationic radical different from Z selected from the group of

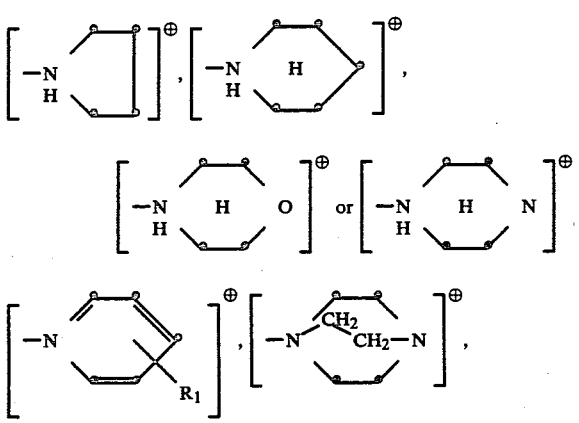

$[-NH(CH_2)_p-N(R_1)_3]^\oplus$, $[-NH(CH_2)_p-NH(R_1)_2]^\oplus$,

-continued

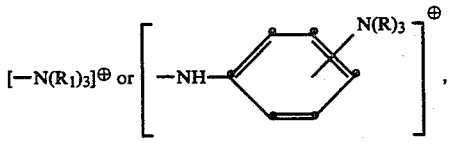

wherein the radicals R and R₁ are as defined below and p is 2 or 3;

R groups independently of one another are each (1) hydrogen, (2) unsubstituted or substituted $C_1$-$C_4$-alkyl wherein the substituent is $C_1$-$C_4$-alkoxy, CN, halogen, phenyl, $CONH_2$, $CONHC_1$-$C_4$-alkyl or $CON(C_1$-$C_4$-alkyl$)_2$, (3) unsubstituted or substituted $C_1$-$C_4$-alkoxy wherein the substituent is phenyl, (4) $NO_2$, (5) unsubstituted or substituted benzoylamino or acetylamino wherein the substituent is halogen, $NH_2$, $NHC_1$-$C_4$-alkyl or $N(C_1$-$C_4$-alkyl$)_2$, (6) halogen or (7) CN;

R₁ groups independently of one another are each (1) unsubstituted or substituted $C_1$-$C_4$-alkyl wherein the substituent is $C_1$-$C_4$-alkoxy, CN, halogen, phenyl, $C_1$-$C_4$-alkyl substituted phenyl, halophenyl or $CONH_2$ or (2) $C_3$-$C_4$-alkenyl;

X is a sulfur atom or the group

wherein R₁ is as defined above or in which both R₁ radicals can be linked with each other to form a carbocyclic 5- or 6-membered ring;

A is the direct bond, —NH-alkylene ($C_1$-$C_4$), —O-alkylene ($C_1$-$C_4$), alkylene ($C_1$-$C_4$), phenylene, —O-phenylene or —NH-phenylene;

Y is —NH—, —NR₁—, —O— or —S—; and

An is an anion.

2. A cationic compound according to claim 1, wherein B is any one of the following cationic radicals:

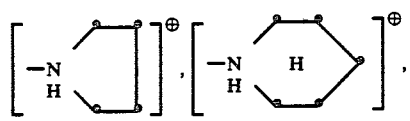

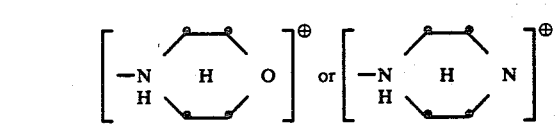

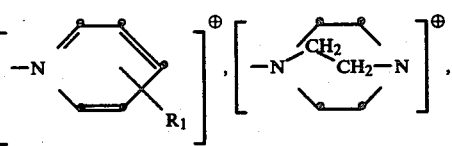

$[-NH(CH_2)_p-N(R_1)_3]^\oplus$, $[-NH(CH_2)_p-NH(R_1)_2]^\oplus$,

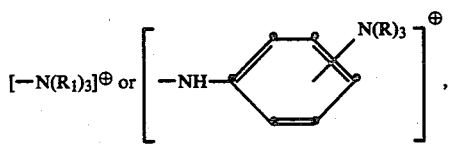

wherein the radicals R and R₁ are as defined in claim 28 and p is 2 or 3.

3. A cationic compound according to claim 1, wherein the symbols Z and B are identical radicals.

4. A cationic compound according to claim 1, wherein R is hydrogen, $CH_3$, $OCH_3$ or chlorine.

5. A cationic compound according to claim 1, wherein R₁ is unsubstituted, straight-chain $C_1$-$C_4$-alkyl.

6. A cationic compound according to claim 5, wherein R₁ is the $CH_3$ group.

7. A cationic compound according to claim 1, wherein X is the

group.

8. A cationic compound according to claim 7, wherein X is the $>C(CH_3)_2$ group.

9. A cationic compound according to claim 1, wherein A is in the m- or p-position relative to the —CH=CH—NH— bridge.

10. A cationic compound according to claim 1, wherein A is the direct bond, or —O-phenylene or —NH-phenylene.

11. A cationic compound according to claim 1, wherein Y is the —NH— or NR₁— group.

12. A cationic compound according to claim 11, wherein Y is the —N.CH₃— group.

13. A cationic compound according to claim 1, wherein B is identical to Z or is the group $[-NH(CH_2)_p-N(R_1)_3]^\oplus$ or $[-NH(CH_2)_p-NH(R_1)_2]^\oplus$ wherein p and R₁ have the given meanings.

14. A cationic compound of the formula